United States Patent

Gelosa et al.

[11] Patent Number: 5,936,121
[45] Date of Patent: Aug. 10, 1999

[54] POLYMERS OF ASPARTIC ACID WITH SEQUESTERING ACTIVITY PROCESS FOR THEIR PREPARATION AND USE THEREOF

[75] Inventors: Davino Gelosa, Travaco' Siccomario; Roberto Ruggieri, Milan; Andrea Sliepcevich, Cormano; Franco Codignola, Milan, all of Italy

[73] Assignee: Sisas Societa' Italiana Serie Acetica E Sintetica Spa, Milan, Italy

[21] Appl. No.: 08/620,330

[22] Filed: Mar. 22, 1996

[30] Foreign Application Priority Data

Mar. 23, 1995 [IT] Italy .............................. MI-95-A-0576

[51] Int. Cl.⁶ ................................................. C07C 229/00
[52] U.S. Cl. ............................................................ 562/565
[58] Field of Search ............................................... 562/565

[56] References Cited

U.S. PATENT DOCUMENTS

| 4,839,461 | 6/1989 | Boehmke . |
| 5,219,952 | 6/1993 | Koskan . |

FOREIGN PATENT DOCUMENTS

| 0 324 270 A1 | 7/1989 | European Pat. Off. . |
| 0 613 920 A1 | 9/1994 | European Pat. Off. . |

*Primary Examiner*—Michael L. Shippen
*Attorney, Agent, or Firm*—Nixon & Vanderhye

[57] ABSTRACT

An oligomer of an aspartic acid is provided having repeating monomeric units of aspartic acid of the formula:

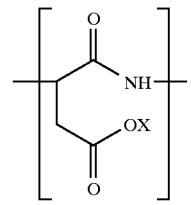

and by a first chain unit having formula:

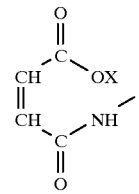

and a chain stopper unit A which is:

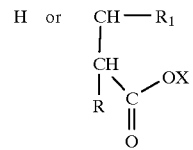

wherein X is an alkali metal, R represents H or an alkyl containing from 1 to 4 carbon atoms and $R_1$ is H or the group —COOX.

10 Claims, 4 Drawing Sheets

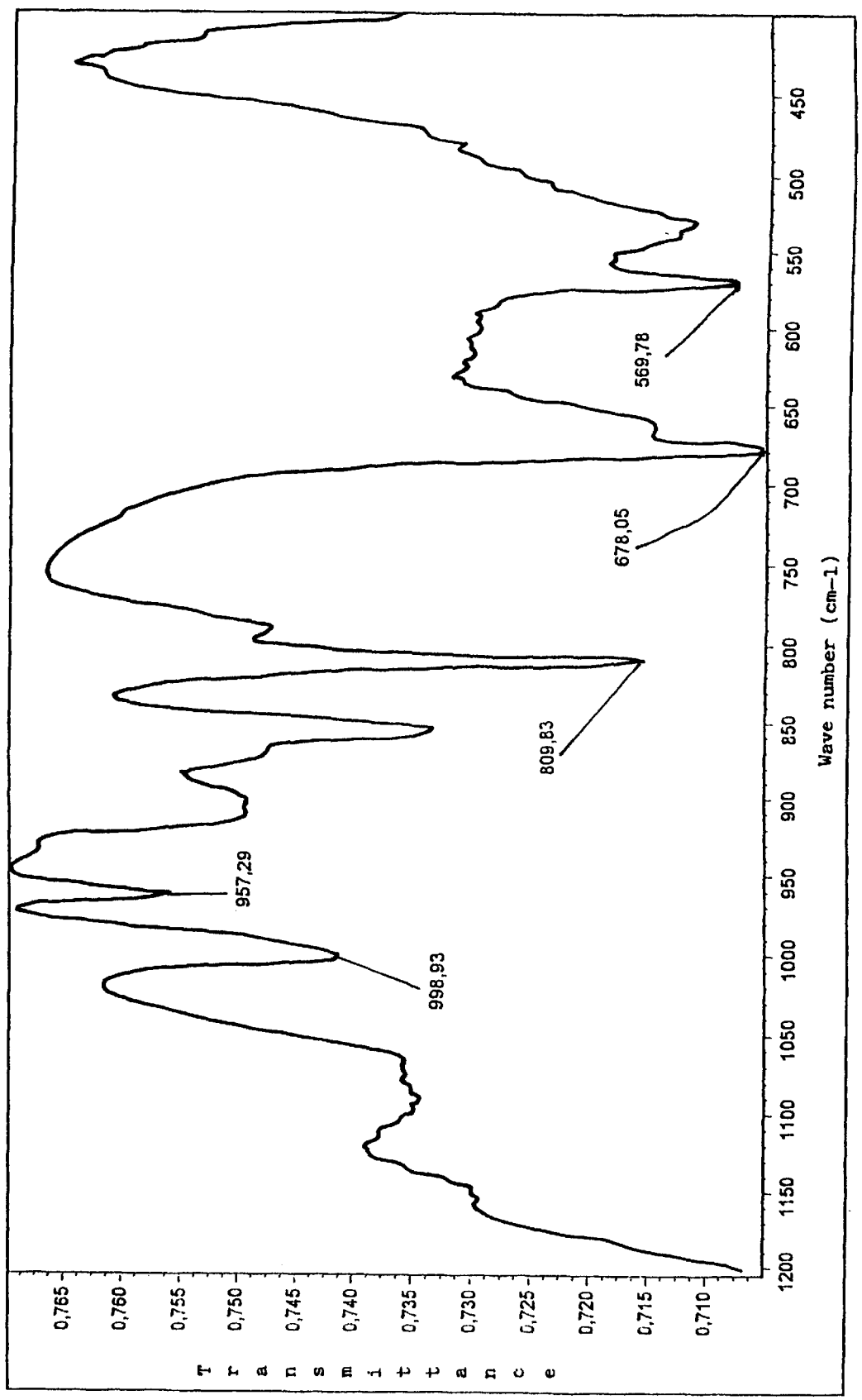

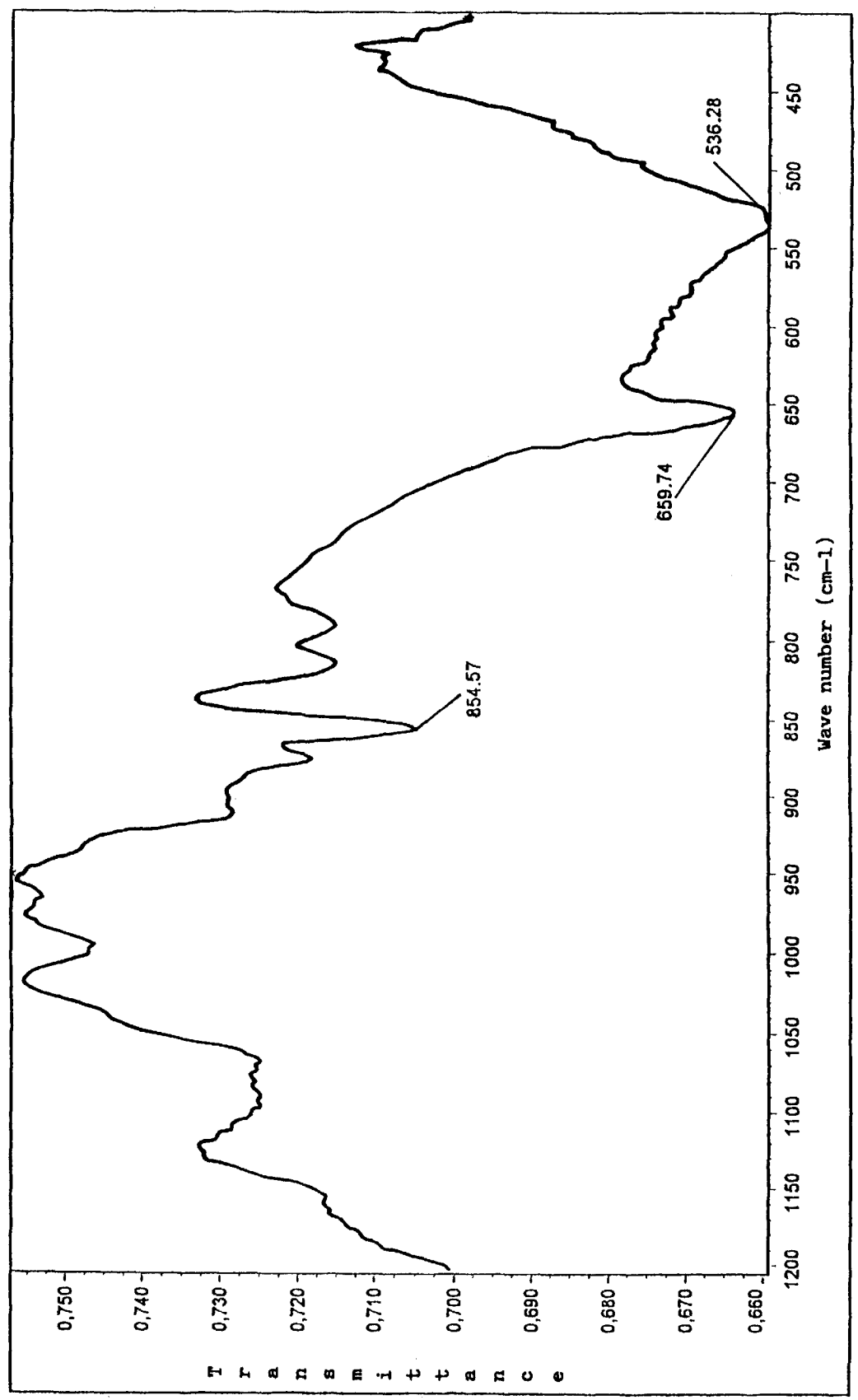
Fig.2 - Test 34 hydrogenated

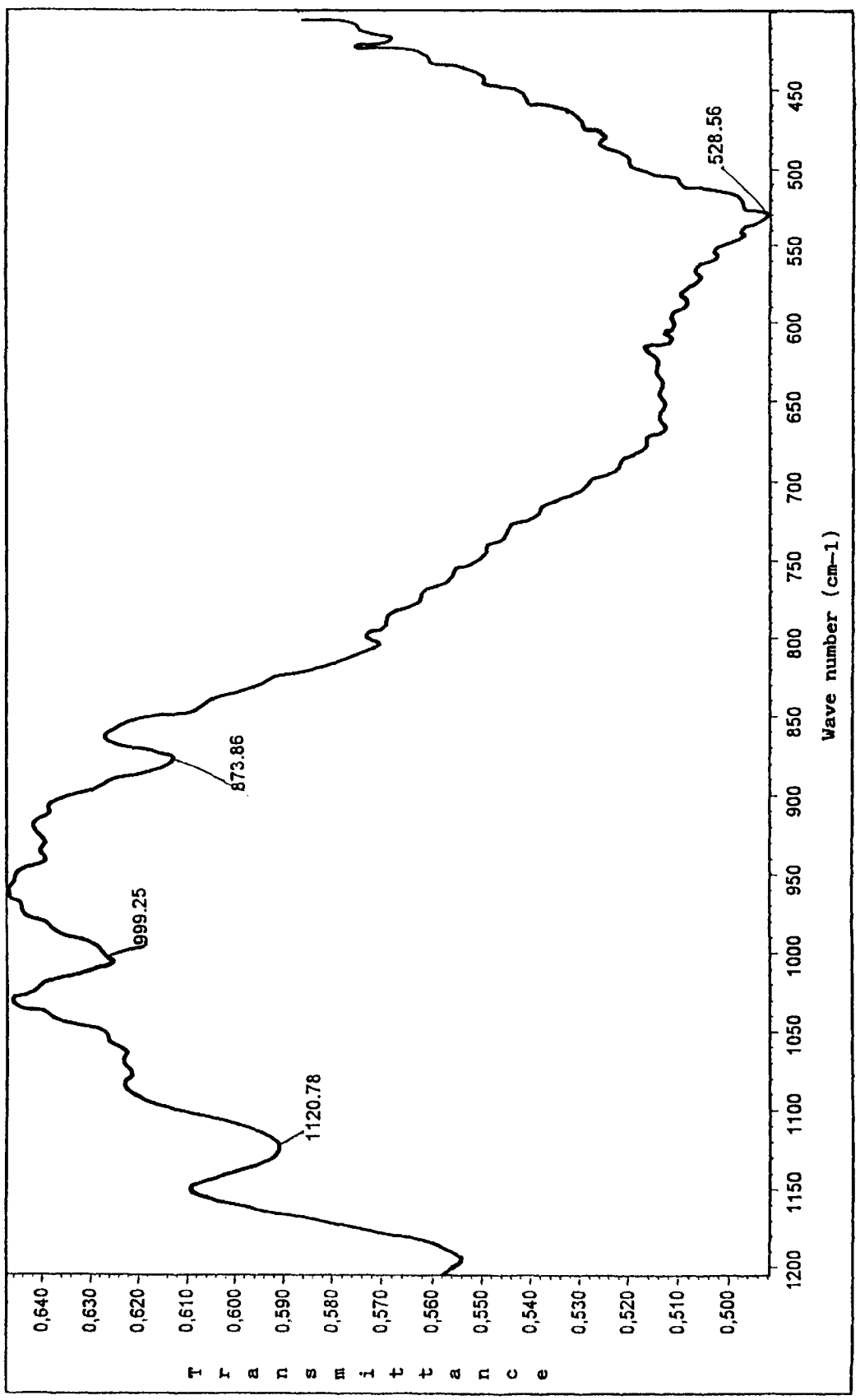

POLYMERS OF ASPARTIC ACID WITH SEQUESTERING ACTIVITY PROCESS FOR THEIR PREPARATION AND USE THEREOF

BACKGROUND OF THE INVENTION

The present invention relates to novel compounds endowed with sequestering activity with regard to alkaline-earth metals, thus useful in industrial water treatment as additives for detergent compositions.

The invention also relates to a process for the preparation of said compounds.

In the recent years great importance has been given to the substitution of products used in the industrial water treatment field and to the substitution of detergency additives with less toxic and more ecologically consistent products. For this reason, substitutes for products such as tripolyphosphates, phosphonates and polyacrylates, have been studied broadly. All these products are very good alkaline-earth metal sequestering agents, but they also present some considerable drawbacks: tripolyphosphates and phosphonates are very difficult to eliminate from waste waters, with danger of pollution of water-bearing strata and eutrophization. Polyacrylates are toxic and not biodegradable.

At the moment great efforts are being made in order to find new and less environmental harmful substitutive products.

Said products, besides having a good sequestering activity with regard to alkaline-earth metals, must also be biodegradable, not toxic and not expensive.

The citric acid, which is biodegradable and not toxic, is commonly used in the form of sodium salt, but it loses its sequestering power at medium-high temperatures, thus limiting its application range.

Only recently, the study of the application in these fields of alkaline earth metals salified aspartic acid polymers has begun. This product has proved to be very efficient in alkaline earth metal ion complexing, preventing their precipitation in the form of insoluble salts, to be suitable for the above-mentioned application fields and for many others.

The aspartic acid is present in nature in its levorotatory or "l" form, while its racemic form "d,l" is usually obtained by chemical methods.

Both the forms can be used for polyaspartate production, as no significative difference can be noticed from the applicability point of view.

It has to be noticed that while the form "l" can only be obtained by an enzymatic process, starting from ammonium fumarate, the racemic form "d,l" can be obtained much more easily by chemical means.

In the patent literature some processes are already known for the production of polyaspartic acid and the salts thereof, mainly sodium salts.

The first process of interest is the one disclosed in U.S. Pat. No. 4,839,461, by which, through ammonium maleate production from maleic anhydride and ammonia (in a molar ratio varying from 1:1 to 1:5) in aqueous solution, followed by evaporation to dryness of the maleate itself and further heating at a temperature of 120–150° C. and under vacuum, a polymer is obtained with molecular weight comprised between 1000 and 4000, mostly between 1800 and 2000.

The process disclosed in U.S. Pat. No. 4,839,461 is heavily disadvantage from the energy point of view because of the necessity to evaporate a great water amount to pass from the diluted ammonium salt solution to the solid phase in which the product formation reaction is performed.

Moreover, the heating of the solid under static conditions, as those hereinbefore described, presents great problems of temperature uniformity in the mass itself, with consequent formation of a product with not highly homogeneous characteristics and with a broad dispersion of molecular weights. This lack of uniformity causes difficulties in the product's characteristics control as well as a worsening of the sequestering properties. Furthermore it is not sufficiently biodegradable.

Another process is claimed in U.S. Pat. No. 5,057,597 which uses l-aspartic acid as the starting material. The reaction is performed in solid phase by a fluid-bed reactor with reaction temperatures comprised between 180 and 250° C.

The l-aspartic acid, in solid and ground form, is fed into a fluid-bed reactor, which is then heated to about 180° C. and kept at a temperature between 180 and 250° C. for such a period to polymerize the l-aspartic acid and evaporate the reaction water. The final result is a polysuccinimide, which is then hydrolyzed, preferably by means of an alkaline hydrolysis.

The process disclosed in said patent, in addition to the higher complexity of the fluid bed polymerization process, utilizes a very expensive product, because of the high energetic cost for the culture medium concentration and for the obtainment of the dried aspartic acid. Also the polycondensation performed in a fluid bed reactor requires very careful management and does not assure a sufficient conditions uniformity in the whole solid mass. Moreover this product is not biodegradable.

The U.S. Pat. No. 5,219,952 does not use l-aspartic acid but maleic anhydride and ammonia.

In the patent there is claimed the production of polysuccinimide using maleic anhydride and ammonia at high temperatures. The preferred polymerization temperature is between 200–260° C. for a reaction time between 7 and 10 hours, while the preferred molar ratio ammonia-maleic anhydride is from 2 to 3:1. The molecular weight of the final product is from 3200 and 10000.

All the processes currently known both using l and/or d,l aspartic acid, maleic anhydride ammonium salt and/or maleamic acid, lead to the production of polysuccinimide which is then hydrolyzed with alkaline hydroxides to obtain the alkaline salts of the polyaspartic acids.

All the said processes neither can control the finished product molecular weight value, nor can limit the distribution of the molecular weights by themselves. As it is well known in the case of similar products, biodegradability is frequently tied to molecular weights: when the number of the polymer monomeric units exceeds a certain amount, biodegradability lowers until it disappears.

During the thermal treatment the polymer becomes also colored, said color also remaining when from the polymer an aqueous solution is formed to obtain the corresponding alkaline salt. Said coloring is very resistant to any kind of treatment: some improvement is obtained with oxidizing products, the consumption thereof is highly considerable, rendering the decoloring process uneconomical.

The polymers (polysuccinimides) obtained by thermal treatments (on the solid mass in a fluid bed, in a high boiling solvent with or without dehydrating agents) according to the different methods reported in patent literature show completely saturated chains and very different molecular weights, being however that value higher than 1000.

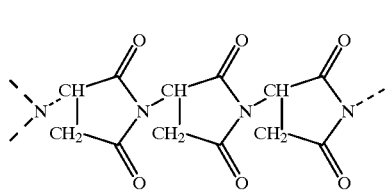

(I)

DESCRIPTION OF THE INVENTION

The main object of the present invention is that of providing compounds with sequestering activity with regards to alkaline earth metals, in particular compounds belonging to the class of polyaspartates.

A further object of the present invention is that of providing an industrially advantageous process for the preparation of polyaspartates having a molecular weight controlled and contained within limits fixed in advance.

The above-mentioned main object is achieved with oligomers of an aspartic acid having repeating monomeric units of aspartic acid having the formula:

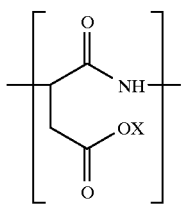

and by a first chain unit having formula:

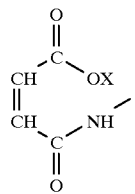

and a chain stopper unit A which is:

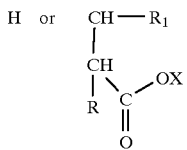

wherein X is an alkali metal, R represents H or an alkyl containing from 1 to 4 carbon atoms and $R_1$ is H or the group —COOX.

X is selected among alkaline metals and any other substituent capable of carrying out an exchange reaction with an alkaline earth metal, R represents H or an alkyl containing from 1 to 4 carbon atoms and $R_1$ is H or the group —COOX.

As it can be seen from formula (II) the oligomer according to the present invention is characterized by the fact that in the first polymeric chain unit a double carbon to carbon bond is present, while at the other chain extremity a chain stopper is present, preferably the group

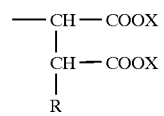

wherein X is a alkaline metal or a substituent capable of carrying out an exchange reaction with an alkaline earth metal and R represents H or an alkyl containing from 1 to 4 carbon atoms.

In the preferred embodiment X represents sodium.

Examples of group A of the above mentioned kind comprise the acrylic, methacrylic, and itaconic acid residues and the alkaline salts thereof.

Referring once more to the preferred embodiment of the present invention, the oligomer of formula II, in which X is sodium, has a molecular weight lower than 1000. In turn, the process according to the present invention, consists in the aqueous phase polymerization of an alkaline metal maleamate or of a precursor thereof in the presence of a chain stopper compound which contains a double carbon to carbon bond in its molecule, containing not more than 5 carbon atoms and at least a carboxy group salified with an alkaline metal or with a substituent capable of undergoing an exchange reaction with the salt of an alkaline earth metal, the reaction temperature being between 90 and 175° C. and the molar ratio between the monomer to be polymerized and the chain stopper compound being between 4:0 and 1:1.

In the preferred embodiment of the process according to the present invention the monomer which undergoes polymerization is sodium and ammonium maleate and the chain stopper compound is disodium maleate, so that in the final oligomer X is sodium.

Through infrared Fourier transform analysis it has been possible to demonstrate the presence of the carbon-carbon double bonds in the compound claimed according to the present invention.

BRIEF DESCRIPTION OF THE DRAWINGS

The invention is further described with reference to the accompanying drawings, in which:

FIG. 1 is an infrared Fourier transform analysis spectrum of the product;

FIG. 2 is an infrared Fourier transform analysis spectrum of the product of FIG. 1 after catalytic reduction;

FIG. 3 is an infrared Fourier transform analysis spectrum of a commercial sodium polyaspartate;

Figure 6:
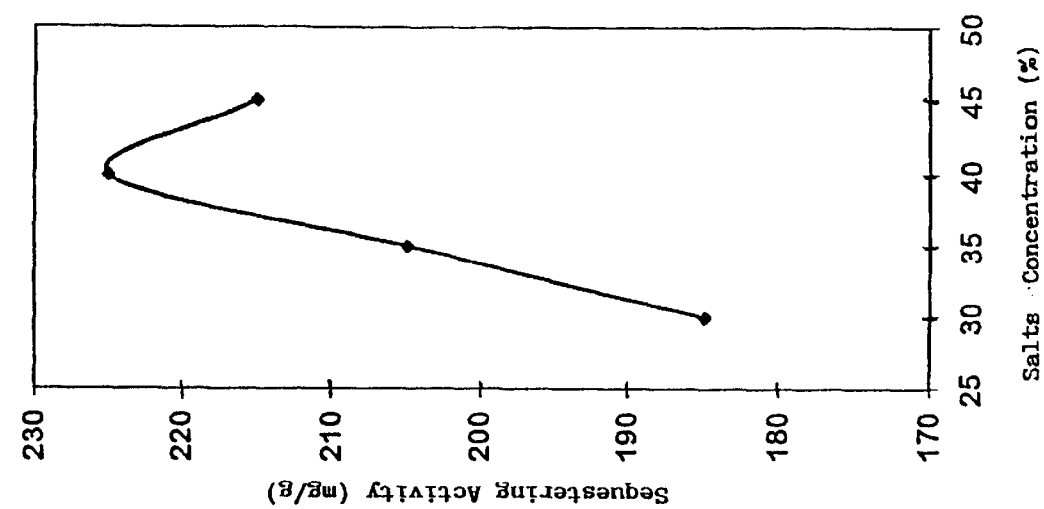
FIG. 6 is a plot of sequestering activity and salt concentration (%).

In fact, if the spectrum (FIG. 1) of said product is compared to the same after catalytic reduction (FIG. 2), or with that of a commercial sodium polyaspartate (FIG. 3), it is evident, in the first case, the presence of absorption bands, in the fingerprint, between 990–660 cm-l, due to the =C—H, which on the contrary are absent in the other cases, that is to say when the carbon to carbon double bond is certainly lacking.

The absorption frequency of said bands, as widely reported in literature, can vary according to the fact that the two carbon atoms of the double bond are mono-, di-, tri-, or tetrasubstituted and, in the case of disubstituted carbon atoms, that the two bonded groups are in cis or trans position.

Among the compounds undergoing the analysis, absorption bands are very well visible at 958 cm-1 and 810 cm-1 which, by the way, are almost completely absent in the same compound when hydrogenated and even more in the commercial sodium polyaspartate.

EXAMPLES

Example 1—Texts with Disodium Maleate and Sodium and Ammonium Maleate

The preparation is carried out according to the following steps.

The disodium maleic acid salt and sodium ammonium maleate are prepared separately. The first one is prepared by dissolving 12.25 g (0.125 moles) of maleic anhydride in 25 g of water and adding, under stirring, 10 g (0.25 moles) of sodium hydroxide.

The second one, that is to say sodium and ammonium maleic acid salt, is prepared by dissolving 49 g (0.5 moles) of maleic anhydride and adding at first 30.5 g of a 28% ammonium hydrate solution (0.5 NH3 moles) and than 20 g of sodium hydroxide (0.5 moles).

The two solutions, in a concentration of between 10 and 45%, and in a ratio between the two desired salts, sodium maleate and sodium ammonium maleate, of between 0:4 and 1:1 (see following examples), are mixed and poured into a reactor.

Then, after washing with nitrogen, the mixture is heated to the desired temperature (120–170° C.), under stirring, then maintained for about 1 hour until the polymerization reaction is completed.

Lastly, after cooling, the product can be used a such or concentrated to the desired volume, or can be dried under vacuum.

The sequestering activity of the final product is usually expressed as calcium carbonate (mg)/sequestering compound (g) and can be determined by titration of the sequestering compound with a calcium salt solution.

The equivalence point can be determined by using a membrane potentiometric electrode or by evaluating the solution turbidity in the presence of sodium carbonate. In the first case the titration is stopped in correspondence of a calcium ion concentrations of 0.0005 moles/liter, which represents the solubility of the ion calcium in carbonates.

Example 2—Different Temperature Tests

The process reported in example 1 is used, where it is described the general method for a preparation starting from disodium maleate and sodium and ammonium maleate. In this case, by keeping fixed the values relating to the two salts ratio (4:1 between sodium ammonium maleate and disodium maleate) and the concentration thereof in water (30%), the reaction temperature is varied operating between 90 and 175° C.

Figure 4:
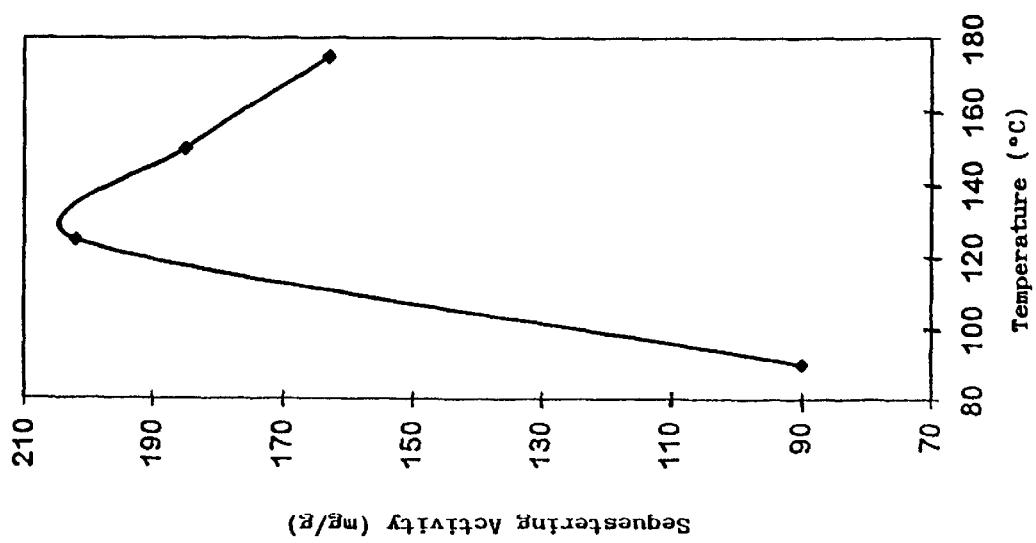
FIG. 4 is a plot of sequestering activity versus temperature.

As it can be seen in the herebelow reported tab. 1 and FIG. 4, the value of the sequestering activity markedly increases with the temperature increase and reaches the highest values in the range comprised between 125–150° C.

At higher temperatures, as it can be seen, in particular, in the result of the test carried out at 175° C., said value tends considerably to decrease.

TABLE 1

Tests at different temperature

| Test N. | Temperature (°C.) | Moles Na,NH$_4$ Maleate | Moles Na$_2$ Maleate | Salts Conc (%) | Sequestering activity (mg/g) | Color |
| --- | --- | --- | --- | --- | --- | --- |
| 39 | 125 | 0.5 | 0.125 | 30 | 202 | White |
| 40 | 175 | 0.5 | 0.125 | 30 | 163 | Yellow ochre |
| 41 | 150 | 0.5 | 0.125 | 30 | 185 | White |
| 43 | 90 | 0.5 | 0.125 | 30 | 90 | White |

Said results seem to confirm that ammonium and sodium maleate, at temperature higher than 110–120° C., is inclined to turn to sodium maleamate, which is able to start the polymerization.

Example 3—Tests at Different Ratios Between the Two Salts

In this case the temperature (150° C.) and the salts concentration (40%), are the fixed parameters, so that to be able to verified the influence of the molar ratio between the two salts, that it to say the disodium maleate (moles)/ammonium and sodium mixed salt (moles) ratio.

The studied range was between 0:4 and 1:1.

Figure 5:
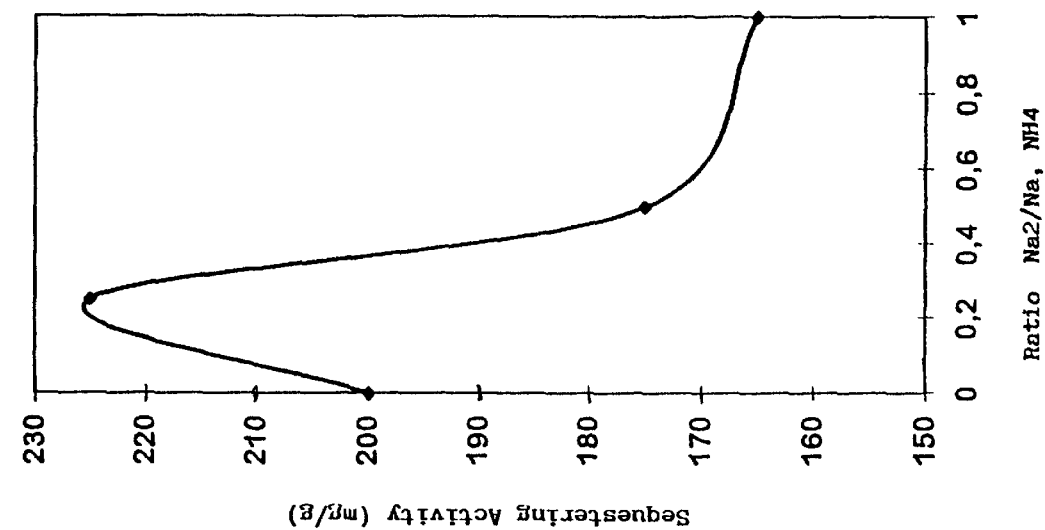
FIG. 5 is a plot of sequestering activity versus ratio of $Na_2/Na$, $NH_4$.

It is possible to observe from the herebelow reported tab. 2 and from FIG. 5, that, even in this case, an optimum range exists, as far as this parameter is concerned, in which the highest sequestering activity values are reached.

TABLE 2

Tests at different ratio between two salts

| Test N. | Temperature (°C.) | Moles Na,NH₄ Maleate | Moles Na₂ Maleate | Salts Conc (%) | Sequestering activity (mg/g) | Color |
|---|---|---|---|---|---|---|
| 35 | 150 | 0.5 | 0 | 40 | 200 | 0 |
| 34 | 150 | 0.5 | 0.125 | 40 | 225 | 0.25 |
| 36 | 150 | 0.5 | 0.25 | 40 | 175 | 0.5 |
| 37 | 150 | 0.5 | 0.5 | 40 | 165 | 1 |

Said value corresponds to one disodium maleate mole for four sodium ammonium maleate moles. In this case the obtained oligomer consists of 5 units.

Example 4—Tests at Different Concentration

In this tests sequence, by operating at constant temperature (150° C.) and salt ratio (4:1), the influence on the sequestering activity of the final product was observed of the global concentration of the two salts in the starting solution.

Experimental tests were performed by operating in a concentration range of between 20% and 45%.

From the obtained results (FIG. 6 and tab. 3) is it possible to observe that a high starting concentration has a positive influence on the final product sequestering activity.

TABLE 3

Tests at different concentration of salts

| Test N. | Temperature (°C.) | Moles Na,NH₄ Maleate | Moles Na₂ Maleate | Salts Conc (%) | Sequestering activity (mg/g) | Ratio Na/Na,NH₄ |
|---|---|---|---|---|---|---|
| 41 | 150 | 0.5 | 0.125 | 30 | 185 | 0.25 |
| 45 | 150 | 0.5 | 0.125 | 35 | 205 | 0.25 |
| 34 | 150 | 0.5 | 0.125 | 40 | 225 | 0.25 |
| 46 | 150 | 0.5 | 0.125 | 45 | 215 | 0.25 |

Said trend can be justified by the fact that a higher starting concentration can promote the sodium maleamate formation (the polymerization precursor) to the detriment of the ammonium salt.

Example 5—Tests Conducted with Maleic Anhydride, Ammonium Hydrate and Sodium Hydroxide The tests were conducted according to the following method: 0.5 moles of ammonium hydrate were slowly added to the maleic anhydride (0.5 moles) dissolved in a little water, and then, under stirring and slowly, so as to avoid an excessive temperature increase, 0.7 moles of sodium hydroxide were also added.

The added soda amount is higher than the one necessary to salify the free carbonyl of the previously formed ammonium maleate.

Operating in such a way the formation is obtained of disodium salt with consequent ammonia development.

The resulting mixture is reacted at 170° C. for 4 hours.

The product obtained according to these operative parameters, after vacuum drying, is spongy and lightly yellow and with a sequestering activity of 170 mg CaCO₃/g.

Example 6—Tests with Maleamic Acids and Soda

In this example the starting product is maleamic acid (0.435 moles) dissolved in water at a concentration of 45%. 0.625 moles of sodium hydroxide are added to this mixture under stirring; owing to the sodium hydroxide, being in excess with respect to the maleamic acid, not only the free carboxyl is salified but also part of the amidic group is hydrolyzed, with consequent ammonia development and formation of a certain amount of disodium salt.

The obtained product, after reacting at 170° C. for 6 hours, and drying in Rotavapor under vacuum, shows a sequestering activity of about 150 mg/g and an almost white color.

Example 7—Tests with Ammonium and Sodium Maleate and Sodium Acrylate

This example is carried out likewise example 1, with the only difference that, instead of the disodium maleic acid salt as chain stopper, sodium acrylate is used.

For this reason, the ammonium and sodium salt (starting from 0.5 moles of maleic anhydride, 0.5 moles of NH₄OH, 0.5 moles of NaOH and 90 g of water) and sodium acrylate (0.125 moles of acrylic acid, 0.125 moles of NaOH and 25 g of water) are prepared separately.

The two solutions are then mixed together, poured into a reactor and, after degassing with nitrogen, heated at 150° C. for 1 hour under stirring.

The obtained product, after drying under vacuum, shows a sequestering activity of 180 mg/g.

The oligomer, which is the object of the present invention, also shows very good values of toxicity and biodegradability.

As far as the toxicity is concerned, in fact, it has been demonstrated, by the "luminescent bacteria test" (extension of the method DIN 38412-L341) that the compound of the above examples shows very high values (higher than 70000 mg/l) of chemical concentration in water for EC50 (Effective Concentration for 50%); the result is expressed as the chemical concentration in water at which the 50% of microorganisms is damaged. For this reason this product can be certainly considered non toxic.

Biodegradability tests were also performed using the method BSB5 (DIN-38409-H51) and that suggested by Vismara (Ingegneria Ambientale, Vol. 3, page 455, 1974) by which the biodegradability is assessed as a function of the ratios between $COD/BOD_{20}$, $COD/BOD_5$ and $BOD_{20}/BOD_5$.

In the first case a product is considered easily biodegradable if its biologic oxidation represents at least the 60% of the COD (chemical oxygen demand).

The product which is the object of the present invention has shown a value of the 76%, which is clearly higher than the minimum level according to which a product is defined as biodegradable.

The indexes obtainable with the method suggested by Vismara are even more reliable as they provide more information as regards the biodegradability of a substance.

More precisely it is reported that a compound presents biologic degradability characteristics when, at the same time, the ratios between $COD/BOD_{20}$, $COD/BOD_5$ and $BOD_{20}/BOD_5$ are respectively lower than 3, 4 and 2.

The compounds of the above examples present values of $COD/BOD_{20}$ comprised between 1,4–1,9, $COD/BOD_5$ between 1,50–2,1 and $BOD_{20}/BOD_5$ between 1,04–1,1. They therefore definitely fall within the previously reported limits and are certainly biodegradable.

We claim:

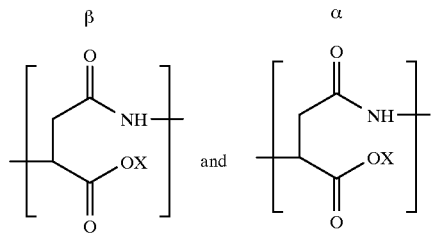

and having a first chain unit of the formula

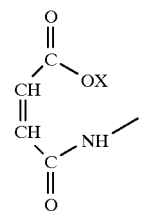

and a chain stopper unit A representing.

1. An oligomer of an aspartic acid consisting of repeating monomeric units of aspartic acid having the formula:

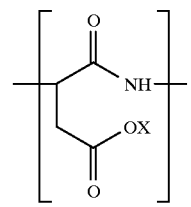

and by a first chain unit having formula:

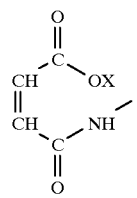

and a chain stopper unit A which is:

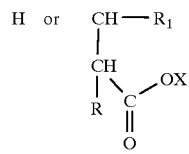

wherein X is an alkali metal, R represents H or an alkyl containing from 1 to 4 carbon atoms and $R_1$ is H or the group —COOX.

2. An oligomer according to claim 1 having absorption bands at about 958 and 810 cm$^{-1}$.

3. An oligomer according to claim 1 wherein X is sodium.

4. An oligomer according to claim 1 wherein said oligomer has a molecular weight lower than 1000.

5. An oligomer according to claim 1 wherein $R_1$ is —COOX wherein X and R are as defined in claim 1.

6. An oligomer according to claim 1 wherein said chain stopper unit is a residue of acrylic acid, methacrylic acid, maleic acid, itaconic acid or a salt of one of said acids.

7. A composition with sequestering activity with regard to alkaline earth metals comprising as an active ingredient an oligomer according to claim 1.

8. A process for the preparation of an oligomer of aspartic acid having a first chain unit of formula

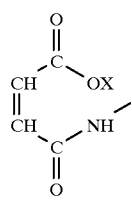

and a chain stopper unit A which is H or

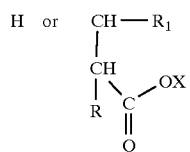

wherein X is an alkali metal, R represents hydrogen or an alkyl containing from 1 to 4 carbon atoms, and $R_1$ is H or the group COOX, said process comprising polymerizing an alkali metal maleamate in aqueous phase in the presence of a chain stopper compound containing a carbon-to-carbon double bond and containing not more than five carbon atoms and at least a carboxy group salified with an alkali metal, the reaction temperature being between 90 and 175° C. and the molar ratio between the monomer to be polymerized and the chain stopper compound being between 4:0 and 1:1.

9. A process according to claim 8 wherein the monomer which is polymerized is selected from the group consisting of sodium maleate and ammonium maleate and the chain stopper is disodium maleate.

10. An oligomer of aspartic acid prepared according to the process of claim 8.

* * * * *